United States Patent [19]

Hsu

[11] Patent Number: 4,627,999

[45] Date of Patent: Dec. 9, 1986

[54] PROCESS FOR PREFINISHED EXTERIOR HARDBOARD

[75] Inventor: Tracy C. Hsu, Avon Lake, Ohio

[73] Assignee: SCM Corporation, New York, N.Y.

[21] Appl. No.: 713,767

[22] Filed: Mar. 20, 1985

[51] Int. Cl.$^4$ .......................... B32B 22/00; B05D 3/02
[52] U.S. Cl. .................................... 428/326; 427/393;
427/393.4; 427/393.5; 427/408; 427/412.2;
428/327
[58] Field of Search ................. 427/393, 393.5, 412.2,
427/407.1, 408, 393.4; 428/326, 327

[56] References Cited

U.S. PATENT DOCUMENTS

| | | | |
|---|---|---|---|
| 3,085,901 | 4/1963 | Lindsey et al. | 427/412.2 X |
| 3,423,232 | 1/1969 | Reinhard et al. | 427/412.2 X |
| 3,850,726 | 11/1974 | Smith et al. | 427/393.5 X |
| 4,029,831 | 6/1977 | Daunheimer | 427/393 X |
| 4,517,240 | 5/1985 | Tracton et al. | 427/393 X |
| 4,521,495 | 6/1985 | Hahn, Jr. | 427/393 X |

*Primary Examiner*—Thurman K. Page
*Attorney, Agent, or Firm*—A. Joseph Gibbons; Thomas M. Schmitz

[57] ABSTRACT

A prepaint sealer and process for treating hardboard and similar board fabricated from cellulosic fibers or chips wherein the sealer comprising a thermoplastic or thermosetting vinylidene chloride latex is applied to the surface of the formed hardboard prior to the application of one or more coatings in the nature of a primer or top finish coat.

9 Claims, No Drawings

PROCESS FOR PREFINISHED EXTERIOR HARDBOARD

The invention relates to prepaint sealers and to an improved process for manufacturing prefinished hardboard and similar substrate destined for high humidity and exterior exposure.

BACKGROUND OF THE INVENTION

Hardboard, fiberboard, particleboard and similar boards are fabricated from wood fibers or chips and consolidated under heat and pressure. Prefinished hardboard is made by consolidating lignocellulosic fibers under pressure in a press followed by application of one or more primer coats and topcoats. The prepaint sealers of the instant invention are applied to the preformed board after removal from the press and before application of a paint primer or topcoat. The sealer may be applied at room temperature or before the board cools. In either case it is integrally cured into the fiberboard surface.

For water repellency it is known to bond the fibers together; for this purpose some manufactures treat the fiber sheet with a small amount of synthetic resin and wax. Notwithstanding such treatment, hardboards still lack good water repellency and have a high degree of water absorption. This water sensitive characteristic of hardboard causes deformation or swelling of the hardboard and failure of later applied coatings. It has been known that vinylidene chloride (VDC) copolymers possess high barrier property to oxygen, carbon dioxide, and water vapor. In the past, the major application of VDC copolymer was used in paper coatings, to provide paper of low moisture vapor transmission rate, e.g. U.S. Pat. No. 3,696,082; USSR Pat. No. 439,946; Ger. Offen No. 2,112,126; Ger. Offen No. 2,522,805; Jpn. Kokai Tokkyo Koho JP No. 57,117,698. Recently, it was employed as anticorrosive coating for metals. In U.S. Pat. No. 3,883,455, vinylidene chloride polymer latex was used as a non-bleeding coating for wood of a high phenolic content in the presence of an organic acid and buffering salt. More recent patents include U.S. Pat. No. 4,336,174 (water-soluble melamine/formaldehyde-styrene/acrylic); and U.S. Pat. No. 4,374,899 (Sanfilippo and White); and U.S. Pat. No. 4,201,802 (Vande Kieft) (vinyl alcohol/fatty acid-esters copolymer). British patent No. 1,558,411 teaches the preparation of various vinylchloride/vinylidene chloride copolymer aqueous latex which are useful for metal coatings and paints generally. These U.S. patents relate mainly to "pre-press" sealers as distinguished from the "prepaint" sealers of the present invention. Pre-press sealers are applied before the fiber board is compacted under heat and pressure. In contrast, prepaint sealers are applied after the board is compacted. The board treated with prepaint sealer is subjected to an oven or infra-red bake before a primer paint and paint topcoat is applied.

The above-described defects, including water sensitivity, have been overcome by the prepaint sealers of the present invention prepared from vinylidene chloride latices. In addition to improved board properties, these boards have excellent water repellency and maintain dimensional stability even when exposed to humidity and outdoor conditions.

BRIEF SUMMARY OF THE INVENTION

One object of the invention is to provide an aqueous prepaint penetrating sealer which imparts water repellence and dimensional stability to hardboard wherein the sealer is a thermoplastic or thermosetting vinylidene chloride copolymer latex composition.

Another object is a process for manufacturing a prefinished hardboard wherein a preformed board, fabricated from fibers or chips, (1) is treated with a vinylidene chloride copolymer latex prepaint sealer, and (2) heat dried or cured to provide a sealed water repellent hardboard which can be further coated with a paint primer and/or topcoat useful for both exterior and interior purposes; wherein the copolymer latex comprises a polymer copolymer or mixtures thereof having a major portion derived from vinylidene chloride and minor portion derived from other unsaturated monomers such as, for example: acrylic and methacrylic acid and their $C_{2-20}$ alkyl esters; hydroxyalkyl acrylates and methacrylates, acrylonitrile, styrene and the like.

A further object of the invention is a process for using polyvinylidene-rich latices as a prepaint sealer for hardboard wherein the sealer contains a thermoplastic or thermosetting polyvinylidene polymer or copolymer having a weight percent content of at least 50% vinylidene chloride and a glass transition temperature suitable for the penetrating and sealing purpose.

DETAILED DESCRIPTION OF THE INVENTION

The process of this invention utilizes an aqueous prepaint sealer applied to the surface of the hardboard and force dried by baking before application of paint primers or topcoats. The prepaint sealer is an aqueous latex comprising by weight from about 35% to about 65% water; about 0% to about 20% carrier solvent; and about 65% to 35% vinylidene chloride copolymer composition. The sealer composition usually contains other ingredients including stabilizers and defoamers. Especially preferred sealer compositions will contain one or more surfactants which apparently aid in enhancing the penetration of the sealer into the board surface and moisture barrier properties. For this purpose fluorocarbon surfactants at concentrations up to 0.8%, preferable from 0.05 to 0.5 weight percent are preferred. Such fluorosurfactants include non-ionic, anionic, and cationic surfactants used alone or in conjunction with the other non-fluorocarbon surfactants. Useful fluorosurfactants include the Zonyl (trademark) available from Dupont especially Zonyl FSA, Zonyl FSP, Zonyl FSE, Zonyl UR, Zonyl FSJ, Zonyl FSN, Zonyl FSN-100, Zonyl FSC, and Zonyl FSK. These may be used alone or in combination with other non-fluorinated surfactants including non-ionic, anionic, and cationic types. Up to 1.5 phr of these surfactants may be used. Non-fluorinated surfactants such as Surfynol TG, Surfynol 104, and Tergitol NP are preferred. A preferred combination thus would be 0.05 phr Zonyl FSA used with 1.0 phr Surfynol TG.

Referring specifically to the polymeric composition, the useful latex may be prepared from a variety of monomers provided that a major proportion of the polymer composition is based on vinylidene chloride. Useful latex compositions contain at least 50 weight percent polymer based on vinylidene chloride and may contain up to 90% vinylidene chloride basis total monomer ingredients. Useful vinylidene copolymer latices can be synthesized from a major portion of vinylidene chloride and a minor portion of one or more polymerizable monomers such as for example, acrylic and methacrylic acid, acrylate and methacrylate esters, styrene, acrylonitrile, and other monomers known in the art to impart specific properties in a finished latex. Such other monomers can include aminoalkyl and hydroxy acrylates or methacrylates as well as modifiers and basifiers such as aminoethanols and dimethaminoalkanols. A preferred latex is a polymer prepared from 40 to 70% vinylidene chloride; 0 to 5% methacrylic acid; 0 to 35% 2-ethylhexylacrylate and other lower alkyl acrylates. Various commercial latexes are useful in formulating the prepaint sealers of the present invention. Such copolymer latexes are derived from vinylidene chloride, and specifically exclude vinyl chloride. These include AMSCO RES AI-9570 and AMSCO RES P-777 (Union Oil Company of California). Other useful latices include those derived from vinylidene chloride and small amounts of acrylic acid; those derived from about 67% vinylidene chloride and from about 33% 2-ethylhexylacrylate; and those having about 50% vinylidene chloride, about 5% acrylic-type acids, and various lower alkyl acrylate esters. These copolymers may be synthesized according to know methods such as therein indicated in U.S. Pat. No. 3,883,455 incorporated herein by reference. The latex is applied to a preform composite hardboard after pressing under heat and pressure. Quite often, the composite pre-form includes a surface mat for imparting a more uniform surface on the final hardboard product. Subsequent to hot-pressing, the prepaint sealer is applied to the surfaces of the hard board by conventional application means such as air or airless spray, curtain coating, roller coating, or brushing at a level of about 1.2 to 2.6 grams or more of sealer film-forming solids per square foot of surface area of hardboard product.

In addition to application to the entire board surface, it is contemplated that the prepaint sealer can advantageously be applied to the bottom drip edge of the board since this position is most like to be attacked by water. Of course it is possible to treat only the drip edge. Usually only one surface of the hardboard is coated, but when necessary, the entire board may be protected.

In addition to the improved properties exemplified in the examples, the instant invention enhances board properties including resistance to swelling, cracking, fiber popping, and water or moisture penetration. The following comparison table shows the relative superiority of the instant coatings over possible alternative coatings:

| Type | Water Uptake* | Edge Swell/Crack* |
|---|---|---|
| Phenolic | N.A. | N.A. |
| Urethane | Comparable | Swell comparable Cracked during test |
| Epoxy | Better | Higher swell (poorer) |
| Acrylic Cationic Latex | Comparable | Higher swell and cracked |
| Acrylic Anionic Latex | Comparable | Lower swell |
| Water-reducible polyester | Poorer | Higher (poorer) |
| Thermoplastic VDC Latexes | Better | Better except Haloflex 202 |

*Compared with commercial low temperature thermoset acrylic (G3)

The following examples, illustrative of the invention, should not be construed narrowly. All parts are parts by weight and all percentages are weight percentages unless otherwise noted.

EXAMPLE 1

Prefinished hardboard was prepared using Masonite (trademark) board stock. A standard mat hot-pressing process was utilized to produce preform composites of hardboard stock about ⅜-inch thick and containing about 6–9% moisture. The finished hardboard stock was then conveyed into an airless spray coating zone where the aqueous prepaint sealer dispersion, made with agitation as indicated below, was sprayed on the hardboard to provide 2½ grams per square foot of final (dry) coating solids.

| Ingredients | Pounds | Weight % |
|---|---|---|
| AMSCO RES AI-9570 (46% solids) | 97.60 | 97.60 |
| DF 401 Defoamer | .05 | .05 |
| Texanol Coalescing Solvent | 2.34 | 2.34 |

The coated board was force dried in an Infra-Red oven for 10–15 seconds to reach a broad surface temperature (BST) of 140° F. and thereafter evaluated for water repellency and for dimensional stability.

EXAMPLE 2

The process of Example 1 was repeated using equivalent amounts of commercial polyvinylidene latex, Control Haloflex 202, and AMSCO RES P-777 in place of AMSCO RES AI-9570. The coated boards were identified as Experiments 2A and 2B, respectively. A third board identified as Experiment 2C was prepared using a commercial low temperature thermosetting latex (G3) exemplified in U.S. Pat. Nos. 4,442,257 and 4,444,941. These boards were evaluated against the coated board of Example 1. From Table I it is seen that the water resistance and dimensional stability properties of all of polyvinylidene polymer treated boards are greatly enhanced over the unsealed control. The thermoplastic coatings of Examples 1A and 2B are quite superior in edge swell to the commercial Haloflex coating 2A. The unsealed and unprimed control is included for comparison purposes.

In the water absorption test the sealed board is held in contact with a measured amount of water using a sealed ring. After 48–72 hrs. the remaining water is measured and water resistance (average of 3 results) is reported as water uptake per 100 in$^2$ per day. Dimensional stability (Edge Caliper Swell Test) was performed by immersing the bottom edge of 4"×6" boards in a 2% TRITON-X-100 aqueous solution for two hrs. at ambient temperature. The deformity was evaluated by measuring the increase of thickness of marked spots at the bottom (immersed) edge.

TABLE I

| Pre-Press Sealer (No Primer, No Topcoat) Example No. | Water Uptake (gms. Per 100 in$^2$/24 hrs.)* | Edge Swell (%) |
|---|---|---|
| 1A | 5.08 | 0.66 ± 0.14 |
| 2A | 3.63 | 9.34 ± 0.58 |
| 2B | 11.35 | 1.32 ± 0.03 |
| 2C** | 20.26 | 7.55 ± 0.67 |
| Control (unsealed) | 30.48 | 26.33 ± 4.74 |

*Average of 3 Tests
**Unsealed control coated with thermoset acrylic (G3) sealer only.

EXAMPLE 3

In a separate comparison test the thermoplastic prepaint sealer of Example 1 was compared with thermoplastic latex sealer P-777 and a high performance acrylic thermoset system (G3). The coated board (low quality wet process) were identified as Examples 3A and 3C, respectively. Example 1 prepaint sealer applied to the same board was identified as Example 1A to maintain correspondence between the respective tables even though the results are for a different board. Test results are shown in Table II.

From Table II it is seen that the sealer (1A) of Example 1 provides the best protection both in water uptake and Edge Swell. The vinylidene thermoplastic sealer (3A) was somewhat better than the thermoset sealer (3C). When a topcoat was applied, the 1A sealer gave the best (lowest) caliper swelling using the Cleveland Condensing Chamber Test. All samples were quite satisfactory.

commercial thermoset sealer (2C). Example 4 differs from Example 3 in that a primer is applied to the sealed board in each case. The primed and sealed boards are respectively designated 1A, 4A, and 4C in Table III. It is noted that sealers 1A and 4A are quite superior to the thermoplastic and commercial thermoset sealer when a primer coat is used with or without a topcoat.

TABLE III

EVALUATION OF VDC LATEXES ON LOW QUALITY WET PROCESS HARDBOARDS
(Primer and Topcoat Applied After Sealing Treatment)

| Sealer (+Primer) | Water Uptake$^a$ (gms/100 in$^2$/24 hrs) | Edge Swell$^b$ (%) | Caliper Swell (%)$^c$ No Topcoat$^d$ | With Topcoat$^d$ | Wax Bleed Test$^e$ |
| --- | --- | --- | --- | --- | --- |
| 1A | 6.03 | 0.25 | 0.22 | 0.83 | Pass |
| 4A | 8.23 | 0.18 | 0.50 | 1.95 | Pass |
| 4C | 14.30 | 0.50 | 0.95 | 1.78 | Pass |

$^a$Average of Five Tests
$^b$Ave. of Three
$^c$Cleveland Condensing Chamber Test, 1 hr. at 60° C.
$^d$Vinyl Acrylic Trade Sales Coating Topcoat - Caliper Swell at Scribe
$^e$Wax Bleed Test After 3 Days at 250° F.

EXAMPLE 5

Using primed low quality wet process hardboard, the prepaint sealer of Example 1 (5A) was evaluated against Haloflex 202 (5B), thermoset latex G3 (5C), a two-pack polyurea (5D). The sealer coats were cured at 15 seconds in an Infra-Red oven to reach a board surface temperature (BST) of 140° F. The two-pack polyurea was cured for 10 minutes in an electric oven at 250° F. A primer coat (G3) was then applied to all of the sealed panels and cured at 60 seconds at 250° F. Water uptake, edge crack, Cleveland Condensing Chamber and warm water (40° C.) test results are shown in Table IV.

TABLE IV

Evaluation of VDC Latexes on Low Quality Hardboards

| Example No. | Water Uptake$^c$ (gms/100 in$^2$/24 hrs.) | Edge Swell$^d$ (%) | Cleveland Condensing$^e$ (% Swell at X Scribe) | Sprinkle Test$^f$ (28 hrs. at 40° C.) | | Fiber Pop |
| --- | --- | --- | --- | --- | --- | --- |
| 5A | 2.61 | 1.83 | 7.87/6.97 | 5.75 | 3.0 | None |
| 5B | 3.34 | 18.21 | 7.29/8.75 | NT | NT | NT |
| 5C$^{(a)}$ | 10.87 | 22.06 | 5.74/8.36 | 7.05 | 6.39 | Yes |
| 5D$^{(b)}$ | 9.88 | 20.39 | 6.40/1.19 | 5.37 | 4.33 | Yes; Severe |

$^a$Control Acrylic Thermoset G3 applied as Sealer
$^b$Commercial Two-Pack Polyurea applied as Sealer
$^c$Test Period Four Days
$^d$Average of Six Data Points
$^e$Cleveland Condensing Chamber Test 60° C. for 1 hr. Average of Three Data Points**
$^f$Swell % at X-Pt. of Scribe
**Numbers are with/without Topcoat.

TABLE II

EVALUATION OF VDC LATEXES ON HARDBOARDS$^a$

| Sealer | Water Uptake (gms/100 in$^2$/24 hrs.) | Edge Swell* (%) | Caliper Swell (%)** No Topcoat*** | With Topcoat*** |
| --- | --- | --- | --- | --- |
| 1A | 3.51 | 0.12 | 7.7 | 4.66 |
| 3A | 11.54 | 2.49 | 4.33 | 7.0 |
| 3C | 16.30 | 7.88 | 3.18 | 6.96 |

$^a$Low Quality Wet Process Hardboard
*Average of Three Tests
**Cleveland Condensing Chamber Test
***Carolina Coating Topcoat - CALIPER SWELL at Scribe

EXAMPLE 4

Using a low quality wet process hardboard, the sealers from Examples 1 and 2 (designated 1A and 2B) were applied to the board and then prime coated with a thermoset primer system. These were evaluated against a

EXAMPLE 6

Using primed high quality wet process hardboard, the prepaint sealer of Example 1 (6A) was evaluated against Haloflex 202 (6B), thermoset G3 (6C) and two-pack urea (6D) as prepaint sealers. With the exception of the control all sealed panels were prime coated with G3 acrylic thermoset primer. Test results are shown in Table V.

TABLE V

Evaluation of Prepaint Sealers on Hardboard

| Example No. | Water Uptake* (gms/100 in$^2$/24 hrs.) | Edge Swell** (%) |
| --- | --- | --- |
| 6A | 4.27 | 0.92 |
| 6B | 4.00 | 11.05 |
| 6C | 9.73 | 6.93 |
| 6D | 9.69 | 7.79 |

TABLE V-continued

Evaluation of Prepaint Sealers on Hardboard

| Example No. | Water Uptake* (gms/100 in²/24 hrs.) | Edge Swell** (%) |
|---|---|---|
| Control*** | 8.85 | N.T.**** |

*Test Period 66 hrs.; Average of 3 data points
**Average of 6 data points
***No sealer, no primer
****Not Tested

EXAMPLE 7

Effect of Fluorosurfactants on Sealer Efficiency

Using low quality primed hardboard, prepaint sealer of Example 1 (1A) was formulated with different levels of various fluorosurfactants from Dupont. The sealed board was coated with G3 primer and tested for water uptake. For the wax bleed test topcoats were applied after aging as indicated. The topcoated boards were evaluated for tape adhesion after drying the topcoat for 24 hrs. at room temperature.

As shown in Table VI the water uptake was further diminished with the sealer/surfactant formulation.

TABLE VI

Effect of Fluorosurfactants on Prepaint Sealer Efficiency

| Type of Flourosurfactant and Level (PHR) | Water Uptake$^a$ (gm/100 m²/day) | Wax Bleed Test$^b$ 3 Days at 250° F. | Wax Bleed Test$^b$ 21 Days at R.T.** |
|---|---|---|---|
| None | 6.37 | Pass | Pass |
| FSA, .025 | 6.21 | *N.T. | N.T. |
| FSA, .05 | 4.60 | Pass | Pass |
| FSA, .075 | 4.41 | N.T. | N.T. |
| FSA, .1 | 4.11 | N.T. | N.T. |
| FSN, .05 | 4.42 | Pass | Pass |
| FSC, .05 | 4.63 | Pass | Pass |
| G3 Sealed control | 14.74 | Pass | Pass |

$^a$Ave. of triplicate
$^b$Primed boards were coated with topcoats after aged as indicated in the table. Then the tape adhesion test was done after topcoat was dried at room temperature for 24 hours. Topcoats used for this test included Glidden T-3600 and Sherwin-Williams A-100. All boards tested showed cohesive failure of hardboard fiber.
*N.T. - not tested
**r.t. - room temperature

What is claimed is:

1. In a process for the manufacturing of a prefinished hardboard to withstand moisture and weathering which comprises:
   (a) forming the board in a press from lignocellulosic fibers under heat and pressure,
   (b) releasing the hardboard from the press,
   (c) applying one or more coatings in the nature of primer and top finish coatings,
   (d) curing the coated board after each coating application;
   the improvement which comprises treating said hardboard between steps (b) and (c) with a vinylidene chloride copolymer prepaint sealer and curing or drying said sealed board before application of the primer or finish coat which comprises:
   (a) 50–90 weight percent vinylidene chloride;
   (b) 10–50 weight percent other copolymerizable monomers selected from the group consisting of acrylic and methacrylic acid and their $C_{1-20}$ alkyl or unsaturated alkyl esters, styrene, acrylonitrile, and hydroxyalkyl or aminoalkyl acrylate or methacrylate; and
   wherein said sealer is optionally formulated with 0.01 to 1.25 parts per hundred parts resin of a surfactant selected from the group consisting of nonionic, anionic, cationic and amphoteric fluorosurfactants and non-fluorinated surfactants and mixtures thereof.

2. A process for preparing prefinished, water-resistant hardboard comprising:
   (a) providing a plurality of layers of fiberboard stock material in the form on a non-consolidated preformed fiberboard product;
   (b) hot pressing said preformed fiberboard at temperatures of at least about 100° C. within a press for time sufficient to consolidate said preformed fiberboard into a solid fiberboard product;
   (c) releasing said fiberboard product from the press surface;
   (d) applying to the surface of said fiberboard product a latex prepaint sealer derived by the copolymerization of
   (1) 50–90 weight percent vinylidene chloride; and
   (2) 10–50 weight percent other copolymerizable monomers selected from the group consisting of acrylic and methacrylic acid and their $C_{1-20}$ alkyl or unsaturated alkyl esters, styrene, acrylonitrile, and hydroxyalkyl or amino alkyl acrylate or methacrylate; wherein said sealer is formulated with a fluorosurfactant present at from 0.02 to about 0.6 part per hundred parts resin.

3. The process of claim 2 wherein the latex sealer is a thermoplastic latex and wherein the vinylidene chloride copolymer comprises 65–80 percent vinylidene chloride and 20–35 percent monomers selected from the group consisting of methacrylic acid, 2-ethylhexylacrylate and acrylonitrile.

4. The process of claims 2 and 3 wherein the latex sealer is a thermoplastic latex and contains up to 0.15 parts per hundred resin of a fluorosurfactant.

5. The process of claim 2 wherein the copolymer latex sealer additionally contains a melamine-formaldehyde, urea-formaldehyde or glycoluril crosslinker and the copolymer latex contains sufficient functionality to react with said crosslinker within the board surface.

6. The process of claim 2 wherein said sealer is applied before application of the primer or finish coat.

7. The process of claim 2 wherein the said sealer is applied to the board as a component of the primer coat.

8. A hardboard coated by the process of claim 2.

9. The process of claims 1 or 2 wherein the vinylidene halide is vinylidene chloride; the other polymerizable monomers comprise methacrylic acid, 2-ethylhexylacrylate and 0–10 percent hydroxyalkyl and/or amino alkyl acrylate or methacrylate; and the sealer additionally contains from 2–25 percent crosslinking agent based on total polymer.

* * * * *